W. S. FERGUSON & A. W. McMICHAEL.
CHAIN SECURING AND RELEASING DEVICE.
APPLICATION FILED OCT. 20, 1908.

942,061.

Patented Dec. 7, 1909.

Witnesses
E. K. Stewart
E. Daniels

Inventors
William S. Ferguson and
Artie W. McMichael
By C. A. Snow & Co.
Attorneys

UNITED STATES PATENT OFFICE.

WILLIAM S. FERGUSON AND ARTIE W. McMICHAEL, OF LEESVILLE, LOUISIANA.

CHAIN SECURING AND RELEASING DEVICE.

942,061. Specification of Letters Patent. Patented Dec. 7, 1909.

Application filed October 20, 1908. Serial No. 458,693.

*To all whom it may concern:*

Be it known that we, WILLIAM S. FERGUSON and ARTIE W. McMICHAEL, citizens of the United States, residing at Leesville, in the parish of Vernon, State of Louisiana, have invented a new and useful Chain Securing and Releasing Device, of which the following is a specification.

This invention has relation to chain securing and releasing devices, and it consists in the novel construction and arrangement of its parts, as hereinafter shown and described.

In the use of chains for binding logs, lumber, and the like upon wagons and cars it is common to employ a hook upon one end thereof which is adapted to receive one of the links of the chain. As the logs or lumber spread apart in being transported, however, great difficulty has been experienced in disconnecting the hook from the chain owing to the great strain to which the chain and hook are subjected. The usual method of disengaging the hooks from the links at such times is by forcing the same through the agency of an ax or other like instrument. This is apt to break the hook or bend it into such form that it is thereafter useless. Devices have been provided with a view of securely retaining the end of a chain when used as above indicated, and at the same time with a view of overcoming the objections noted, but they are frequently difficult to manipulate and ineffective in their securing qualities.

The present invention has for its object to provide a device for securing a chain about a load and which may be easily and readily operated for liberating the chain, in such manner as to assure that the same will not foul or bind against any of the parts of the chain securing device.

Figure 1:
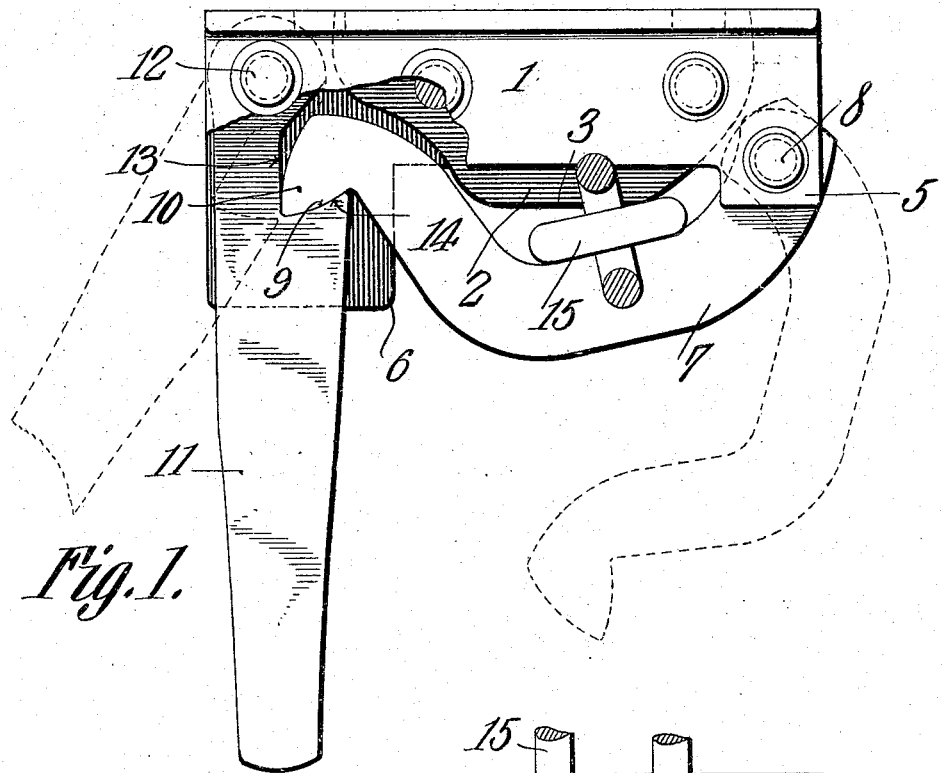
Figure 2:
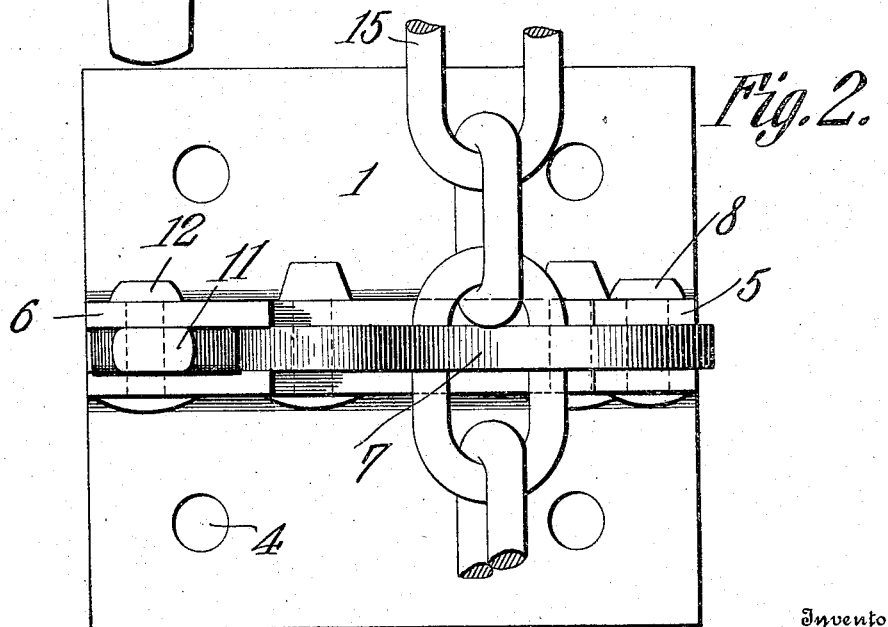

In the accompanying drawings, Figure 1 is a plan view of the chain securing and releasing device with parts broken away, and Fig. 2 is a side elevation of the same.

The chain securing and releasing device consists primarily of three parts, namely: a body, a staple pivotally connected thereto, and a lever fulcrumed to the body. The body consists of the plates, 1—1 which are spaced apart and held in such relation by the intervening block 2. The edge of the said block projects beyond the edges of the plate 1 and is provided with a chain bearing surface 3. The plates 1 are provided with bolt perforations 4, or may be provided with other means whereby they may be mounted upon a fixed support. The plates 1 are provided at their end portions beyond one end of the block 2 with the lugs 5, and at the opposite end of the block 2 with the lugs 6. The staple 7 is pivotally connected with the body 1 by means of the pivot bolt 8 which passes transversely through the said staple and the lugs 5. The staple 7 is adapted to straddle the block 2, and is provided at its free end with an arcuate edge 9. The edge 9 forms one of the sides of the lug or lip 10 which is laterally disposed with relation to the general longitudinal axis or configuration of the said staple. The handle lever 11 is fulcrumed between the plates 1 at the point 12. Said lever is provided in its edge and at a point between the fulcrum point 11 and its handle end, with a notch 13 which in turn is provided with an arcuate wall 14. The notch 13 is adapted to receive the free end of the staple 7, and the arcuate edge 9 of the said staple is adapted to have contact with the arcuate wall 14 of the said notch 13. When the free end of the said staple 7 is within the notch 13 of the lever 11, the intermediate portion of the said staple 7 has its edge opposite the chain bearing surface 3 of the block 2, out of parallel relation with the said chain bearing surface of the said block, and the inner edge of the said staple 7 and the chain bearing surface 3 gradually approach each other toward the pivot 8 upon which the staple 7 is mounted. The arcs which describe the edge 9 and wall 14 are struck from the fulcrum 12 of the lever 11 as a center.

The operation of the chain securing and releasing device is as follows: The chain 15 is laid against the chain bearing surface 3 of the block 2, and the staple 7 is brought around against the outer side of the said chain 15, and the free end of the said staple 7 is engaged or inserted in the notch 13 of the handle lever 11. Then as stress is applied to the chain 15, the said chain will have a tendency to move toward the pivot 8 upon which the staple 7 is mounted. This is due to the fact that the inner edge of the said staple 7 and the chain bearing surface 3 of the block 2, gradually approach each other. Consequently the chain 15 will become wedged between the said staple 7 and the block 2. This will have a tendency to force the free end of the said staple away from the fulcrum point 12 of the lever 11, and as the arcuate edge 9 of the said staple 7 is in engagement with the arcuate side 14 of the notch 13, the free end of the staple 7 will have a tendency to hold the lever 11 against lateral movement. Thus the chain 15 will be securely held and the tension to which the said chain is subjected adds to the security with which the said chain is confined. When, however, it is desired to release the chain 15, the handle end of the lever 11 is grasped, and the said lever is swung manually upon its fulcrum point, and when the arcuate wall 14 of the notch 13 passes beyond the end of the staple 7 the said staple may swing laterally and the chain 15 is immediately released.

In view of the fact that the arrangement of parts as shown and described in the present device is such as to avoid the necessity of inserting any of the parts through the links of the chain in order to secure the same, there is no danger of the said links becoming wedged on any of the parts of the securing device. Consequently the chain may be promptly released.

Having described our invention what we claim as new and desire to secure by Letters Patent is:—

1. A chain securing and releasing device comprising a body having an upstanding chain bearing surface, a staple pivotally connected at one end with the body and cut away from its edge to straddle the chain bearing surface thereof, and to receive the chain and a lever fulcrumed to the body and having a notch located between its fulcrum point and handle end for the reception of the free end of the staple.

2. A chain securing and releasing device comprising a body having a support-engaging base and a chain bearing surface disposed at an angle to the plane of the support-engaging base, a staple pivotally connected at one end with the body and adapted to straddle the chain bearing surface thereof with its edge opposite said surface out of parallel relation thereto, and a lever fulcrumed to the body and having a notch for the reception of the free end of the staple.

3. A chain securing and releasing device comprising a body having a chain bearing surface, a staple pivotally connected at one end with the body and adapted to straddle the chain bearing surface thereof, said staple having at its free end an arcuate edge and a lever fulcrumed to the body and having a notch provided with an arcuate side, said notch being adapted to receive the free end of the staple whereby the arcuate side and edge may have contact with each other.

In testimony that we claim the foregoing as our own, we have hereto affixed our signatures in the presence of two witnesses.

WILLIAM S. FERGUSON.
ARTIE W. McMICHAEL.

Witnesses:
H. H. PYE,
P. G. PYE.